US008495649B2

United States Patent
Krieger et al.

(10) Patent No.: US 8,495,649 B2
(45) Date of Patent: Jul. 23, 2013

(54) SCHEDULING THREADS HAVING COMPLEMENTARY FUNCTIONAL UNIT USAGE ON SMT PROCESSORS

(75) Inventors: Orran Y. Krieger, Newton, MA (US); Bryan S. Rosenburg, Cortlandt Manor, NY (US); Balaram Sinharoy, Poughkeepsie, NY (US); Robert B. Tremaine, Stormville, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1655 days.

(21) Appl. No.: 11/488,970

(22) Filed: Jul. 19, 2006

(65) Prior Publication Data

US 2011/0126200 A1    May 26, 2011

(51) Int. Cl.
*G06F 9/46*    (2006.01)
(52) U.S. Cl.
USPC .......................................... 718/105
(58) Field of Classification Search
USPC ............................... 718/102, 105
See application file for complete search history.

(56) References Cited

U.S. PATENT DOCUMENTS

| | | | |
|---|---|---|---|
| 6,212,544 B1 | 4/2001 | Borkenhagen et al. | |
| 6,535,905 B1 | 3/2003 | Kalafatis et al. | |
| 6,549,930 B1 | 4/2003 | Chrysos et al. | |
| 6,895,520 B1 * | 5/2005 | Altmejd et al. | 713/324 |
| 7,475,399 B2 * | 1/2009 | Arimilli et al. | 718/104 |
| 2005/0081183 A1 * | 4/2005 | Accapadi et al. | 717/100 |
| 2005/0154860 A1 * | 7/2005 | Arimilli et al. | 712/216 |

OTHER PUBLICATIONS

Sazeides et al. "How to Compare the Performance of Two SMT Microarchitectures", ISPASS-2001, Nov. 4-6, 2001.*

* cited by examiner

*Primary Examiner* — Meng An
*Assistant Examiner* — Brian Chew
(74) *Attorney, Agent, or Firm* — Scully, Scott, Murphy & Presser, P.C.; Daniel P. Morris, Esq.

(57) ABSTRACT

A method and system for scheduling threads on simultaneous multithreaded processors are disclosed. Hardware and operating system communicate with one another providing information relating to thread attributes for threads executing on processing elements. The operating system determines thread scheduling based on the information.

20 Claims, 5 Drawing Sheets

THREAD ID 1

| | FPU1 | FPU2 | INT1 | INT2 | ALU | ... |
|---|---|---|---|---|---|---|
| PHASE 1 | HIGH | LOW | LOW | LOW | HIGH | |
| PHASE 2 | LOW | LOW | HIGH | LOW | LOW | |
| PHASE 3 | HIGH | HIGH | HIGH | HIGH | HIGH | |
| PHASE 4 | LOW | LOW | HIGH | LOW | LOW | |
| ... | ... | ... | ... | ... | ... | ... |

THREAD ID 2

| | FPU1 | FPU2 | INT1 | INT2 | ALU | ... |
|---|---|---|---|---|---|---|
| PHASE 1 | LOW | HIGH | HIGH | HIGH | LOW | |
| PHASE 2 | HIGH | HIGH | LOW | HIGH | LOW | |
| PHASE 3 | HIGH | LOW | LOW | LOW | HIGH | |
| PHASE 4 | LOW | LOW | HIGH | HIGH | HIGH | |
| ... | ... | ... | ... | ... | ... | ... |

FIG. 5

SCHEDULING THREADS HAVING COMPLEMENTARY FUNCTIONAL UNIT USAGE ON SMT PROCESSORS

STATEMENT REGARDING FEDERALLY SPONSORED RESEARCH OR DEVELOPMENT

This invention was made with Government support under Contract No. NBCH020056 (DARPA) awarded by Defense, Advanced Research Projects Agency. The Government has certain rights in this invention.

FIELD OF THE INVENTION

The present disclosure generally relates to computer processing and particularly to multithreaded processing.

BACKGROUND OF THE INVENTION

As the number of available transistors has increased, processor-chip architects have turned to multithreaded processors such as simultaneous multithreaded (SMT) processors as a way to continue to increase performance. Generally, SMT processors permit multiple threads to execute instructions using the same set of functional units within a given core. However, this means that the different hardware threads then compete for use of those functional units. One class of shared resources includes the execution units or functional units such as the integer units, floating-point units, load-store units, and the like. It is predicted that SMT processor will become a commonplace platform for the next generation of processor chips. However, because of its capability to allow sharing of processor resources, SMT technique in processors introduces a new degree of complexity in scheduling.

Currently, hardware does not provide the operating system with a capability to understand the crucial attributes of a thread on an SMT processor. The operating system may perform better job scheduling functions, for example, if it is made aware of the thread characteristics. Thus, what is needed is a method and system for the hardware and the operating system on multithreaded processors such as SMT processors to communicate information about the threads on the processors, so that for example, an operating system may utilize the information for effective scheduling.

BRIEF SUMMARY OF THE INVENTION

A method and system for scheduling one or more threads in multithreaded processing are provided. The method in one aspect includes determining usage pattern characterization of hardware resources on a core associated with a first thread. The method also includes selecting a core running one or more threads that have usage pattern characterization that complement the usage pattern characterization associated with the first thread. The selected core runs the one or more threads in simultaneous multithreaded processing mode. The method further includes scheduling the first thread on the selected core.

In another aspect, the step of determining usage pattern characterization of hardware resources on a core associated with a first thread includes evaluating usage pattern of hardware resources on a core associated with a first thread. The evaluating step may be performed by an operating system.

Yet in another aspect, the step of determining usage pattern characterization of hardware resources on a core associated with a first thread may include locating an empty core, running the first thread on the empty core, tracking usage of one or more hardware resources on the empty core, and characterizing usage pattern based on the tracked usage for each phase of execution associated with the first thread. The step of tracking may include tracking usage of one of more hardware resources for each phase of execution associated with the first thread.

Still yet in another aspect, the step of determining may include the hardware tracking the usage of one or more hardware resources and storing the usage in register memory. In another aspect, the step of determining may include determining usage pattern characterization of hardware resources on a core associated with a first thread for each phase of execution associated with the first thread.

In yet another aspect, the method of scheduling one or more threads in multithreaded processing may further include reevaluating the usage pattern characterization associated with the first thread in a new phase of execution when the first thread enters the new phase of execution and rescheduling the first thread in the new phase with one or more second threads having complementary usage pattern characterization.

In one aspect, one or more hardware resources may include but is not limited to one or more processing elements, one or more functional units, one or more cache memory, or combination thereof. In another aspect, the one or more hardware resources may include but is not limited to a floating point unit, an integer unit, arithmetic and logic unit, a shifter, a register, a load-store unit, cache memory or combination thereof.

In one aspect, the step of scheduling is performed by an operating system. The method may further include communicating between software and hardware information associated with one or more threads by using software thread identifier to hardware thread identifier mapping.

Still yet, a method of scheduling one or more threads in multithreaded processing may include evaluating a plurality of usage pattern characterization of one or more hardware resources on a core associated respectively with a plurality of threads for scheduling, selecting a subset of threads from the plurality of threads for scheduling, the subset of threads having complementary usage pattern characterization to one another, and scheduling the subset of threads together on a core running in simultaneous multithreaded processing mode.

Still in another aspect, a method of scheduling one or more threads in multithreaded processing may include evaluating usage pattern characterization of hardware resources on a core associated with a first phase of a first thread and selecting a core running one or more threads that have usage pattern characterization that complement the usage pattern characterization associated with the first phase of the first thread. The selected core runs the one or more threads in simultaneous multithreaded processing mode. The method may also include scheduling the first thread on the selected core and when the first thread enters a second phase, evaluating usage pattern characterization of hardware resources on a core associated with the second phase of the first thread and rescheduling the first thread. In one aspect, the step of rescheduling may include rescheduling the first thread if the one or more threads running on the selected core do not have usage pattern characterization that complements the usage pattern characterization associated with the second phase of the first thread. Still in another aspect, the step of rescheduling may include rescheduling the first thread on a second core.

A system for scheduling threads on a simultaneous multi-threaded processor having one or more cores in one aspect includes a controller unit operable to keep track of usage of one or more hardware resources by a selected thread running on a core and a scheduler operable to use the tracked usage associated with a thread to schedule the thread on a core running one or more second threads having usage pattern that complement the usage associated with the thread. The scheduler in one aspect may be an operating system.

Further features as well as the structure and operation of various embodiments are described in detail below with reference to the accompanying drawings. In the drawings, like reference numbers indicate identical or functionally similar elements.

DETAILED DESCRIPTION

In an exemplary embodiment of the present disclosure, the hardware provides information as to which hardware threads executing on a core are using or have used which hardware resources on a core. Hardware resources, for example, include but are not limited to processing elements, functional units, cache memory or the like on the core. The hardware may also provide information pertaining to memory utilization of a hardware thread, for instance, the hardware thread's use of L1 cache on the core. Additional characteristics or attributes of the hardware threads may be provided. The operating system uses this information to schedule a thread or a group of threads, predict resource availability for scheduled applications, to determine scheduling orders for threads or groups of threads, and to otherwise provide thread scheduling to for example maximize or optimize throughput.

Figure 1:
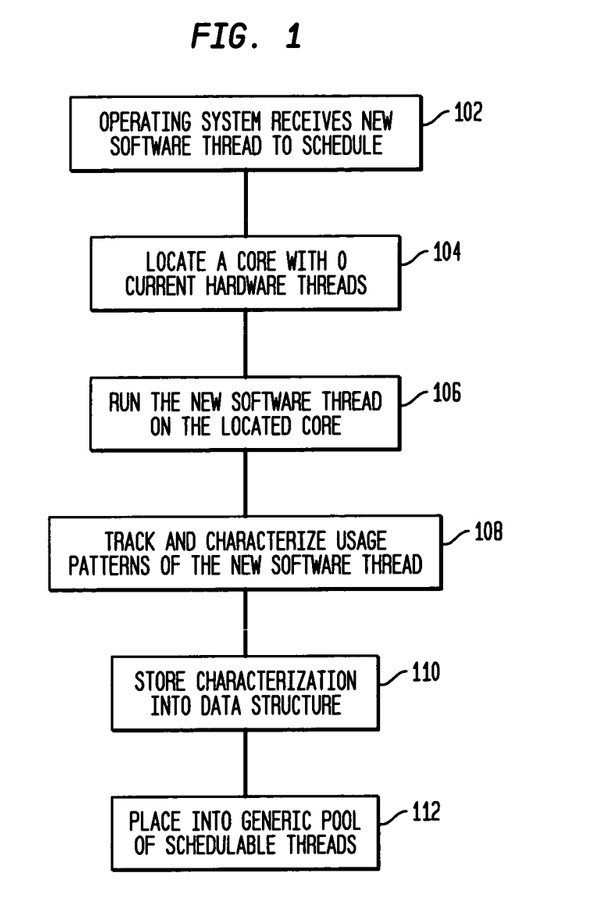
FIG. 1 is a flow diagram illustrating a method of the present disclosure in one embodiment.

FIG. 1 is a flow diagram illustrating a method of the present disclosure in one embodiment. At 102, an operating system or the like receives new software thread $S_0$ to schedule. At 104, the operating system locates a core without any hardware threads currently running on it. Finding an empty core to run the new software thread allows a fairly accurate assessment of the new thread's characteristics and its usage patterns of various functional units and cache on the core. At 106, the new software thread is run on the core. A core on a processor for example includes a plurality of processing elements and can handle an execution of a thread. A core for example can have one or more floating point units, integer units, arithmetic and logic units (ALUs), shifters, registers, decoders, and the like. A processor may include one or more cores. In SMT processing, instructions from multiple threads share the processing elements on the core in a single cycle.

Figure 2:
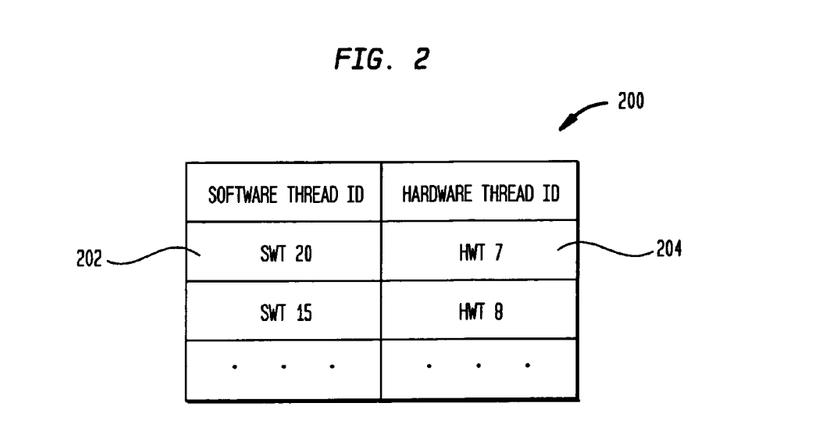
FIG. 2 shows an example of a register storing software to hardware thread mapping.

In one embodiment, in order to correlate the threads that the operating system schedules and the hardware threads that the hardware receives and executes, a mapping of software to hardware threads is kept. This mapping may be stored, for example, in a register. FIG. 2 shows an example of a register table having the software to hardware thread mapping. In one embodiment, when the operating system schedules a thread, the operating system records the software thread identifier (id) 202. When the hardware takes that thread to execute, the hardware tags the thread with a hardware thread id 204 and enters the corresponding hardware thread id in the mapping table 200. The software and the hardware may then communicate regarding threads using the thread id mappings.

Referring to FIG. 1, as the thread executes, the hardware records that thread's use of various processing elements such as the floating point units, integer units, ALUs, shifters, registers, decoder, and the like at 108. The hardware may also log the thread's memory utilization patterns such as the thread's use of L1 cache, the amount of use, etc. Other characterization or attributes of the running hardware thread may be provided similarly. In one embodiment of the present disclosure, this information may be stored or logged in a utilization table such as the one shown in FIG. 3.

Figure 3:
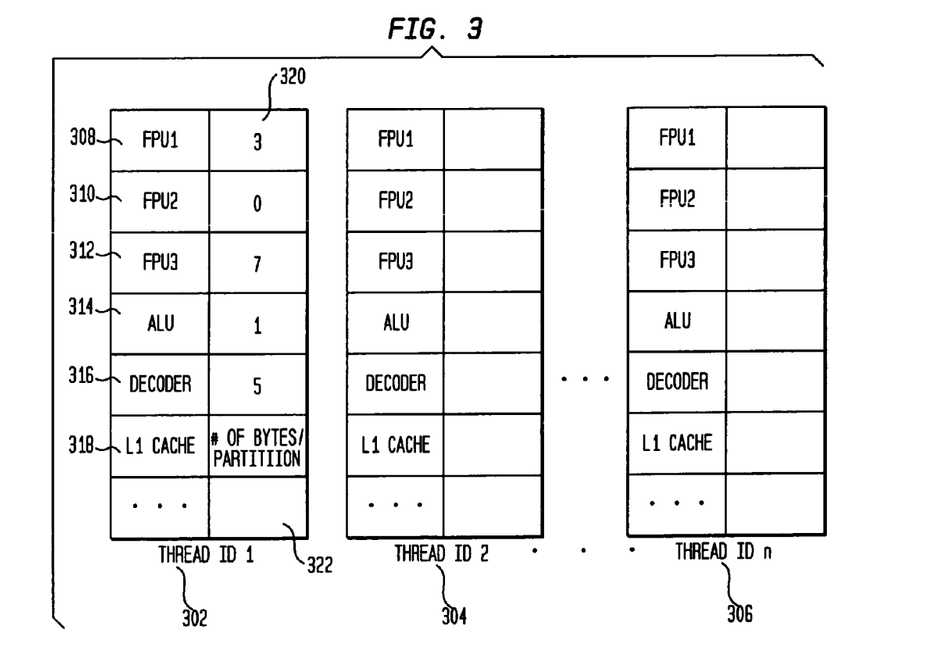
FIG. 3 illustrates an example of a utilization table that is populated as the hardware executes a thread.

FIG. 3 illustrates an example of a utilization table in one embodiment, which for example is populated when the hardware executes a thread. The table may be a register allocated for each thread 302, 304, 306 and readable by the software, for instance, an operating system. The registers may include each thread's usage count or amount of use of each functional unit and cache and the like within a given core. For instance, the tables for thread id 1 (302), thread id 2 (304), thread id 3 (306) in FIG. 3 show three floating point units 308, 310, 312, an ALU 314, a decoder 316, L1 cache 318, etc. on this particular core. Different cores may have different configurations. As a hardware thread is running, the hardware keeps track of the thread's use of each of these functional units, cache memory, and the like, recording the usage in the registers shown in FIG. 3. In one embodiment, each entry 320 in the register may be a counter, for instance, an 8-bit counter that the hardware increments, for example, by one, every time the thread uses that functional unit. In order to keep the counter from wrapping around, the hardware may decrement the count by one, for instance, every predetermined number of cycles. Thus, for example, the counter may be decremented every 10 cycles so that the count does not reach a maximum number too quickly. An entry 322 for cache usage may have different format that would allow the hardware to specify the amount of cache used. For example, number of bytes or partitions that the thread uses may be recorded at 322. Although not shown, a separate memory bank or register may be used to record the cache usage. It should be noted that FIG. 3 is shown for illustrative purposes only. Any other known or will-be-known method or schema for logging or recording information or otherwise communicating information may be used.

Figure 4:
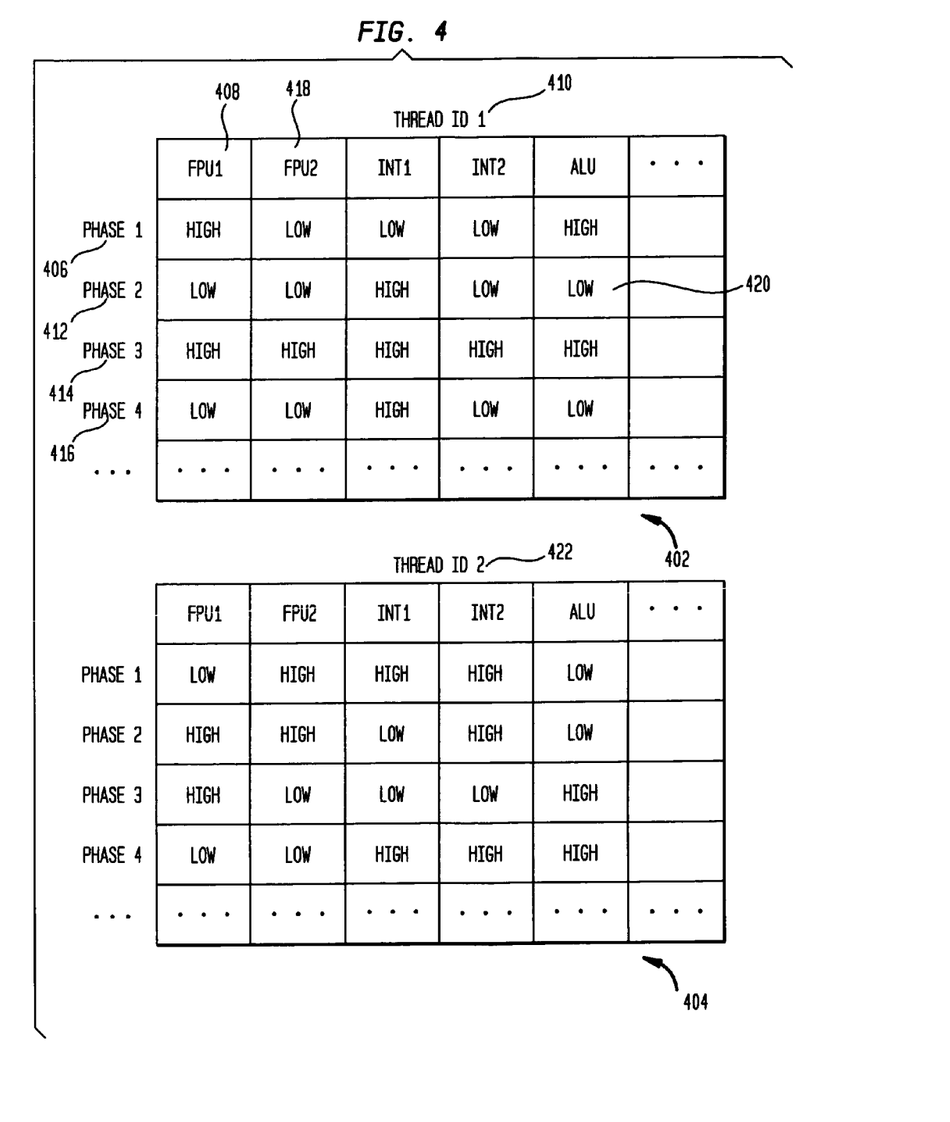
FIG. 4 illustrates data structure that characterizes each thread's phases.

Referring back to FIG. 1, at 110, the recorded patterns of use as shown in FIG. 3 are stored into a characterization data structure such as the data structure shown in FIG. 4. For instance, the operating system reads the recorded patterns and characterizes the thread's use of each functional unit by phases of execution. This characterization per functional unit per thread by each phase is stored into a data structure.

FIG. 4 illustrates data structure characterizing the usage pattern. For each thread, the operating system or the like stores usage patterns in data structure 402, 404, characterizing the usage by each phase 406, 412, 414, 416, etc. of the execution for a given thread. In general, threads have different phases of execution. Phases of execution may include initialization phase, computation phase, data reordering phase, analysis phase, printing phase, etc. For each phase of a given thread, usage pattern for a functional unit is recorded. For example, for thread id 1 (410), use of floating point unit 1 (408) during phase 1 (406) is recorded as high. For thread id 1 (410), use of floating point unit 2 (418) during phase 1 (406)

is recorded as being low. For thread id 1 (410), use of integer unit 1 during phase 1 (406) is recorded as being high. For thread id 1 (410), use of integer unit 2 during phase 1 (406) is recorded as being low. For thread id 1 (410), use of ALU during phase 1 (406) is recorded as being high. During the phase 2 execution, thread id 1's use of floating point unit 1 is low, its use of floating point unit 2 is low, its use of integer unit 1 is high, its use of integer unit 2 is low, etc.

Each entry 420 in the data structure may be a 32-bit value that summarizes the actual usage value or count. For convenience the operating system in this embodiment groups values into high and low categories, however, the raw value can be used, and the thresholds for low versus high can be modified. Further, any other schema or policy may be used to characterize the usage pattern. In addition, any other size or format may be used to store the entries in the characterization data structure. The operating system thus populates the characterization entries over time as the thread executes and the hardware tracks the thread usage patterns as described above.

Referring back to FIG. 1, the new software thread $S_0$ is placed into a generic pool of schedulable threads at 112 after being characterized. The steps shown in FIG. 1 are repeated for additional new threads or applications or the like that the operating system has to schedule. Utilization table for each thread is populated with respective usage information and the characterization data structure is built according to the method shown in FIG. 1.

Figure 5:
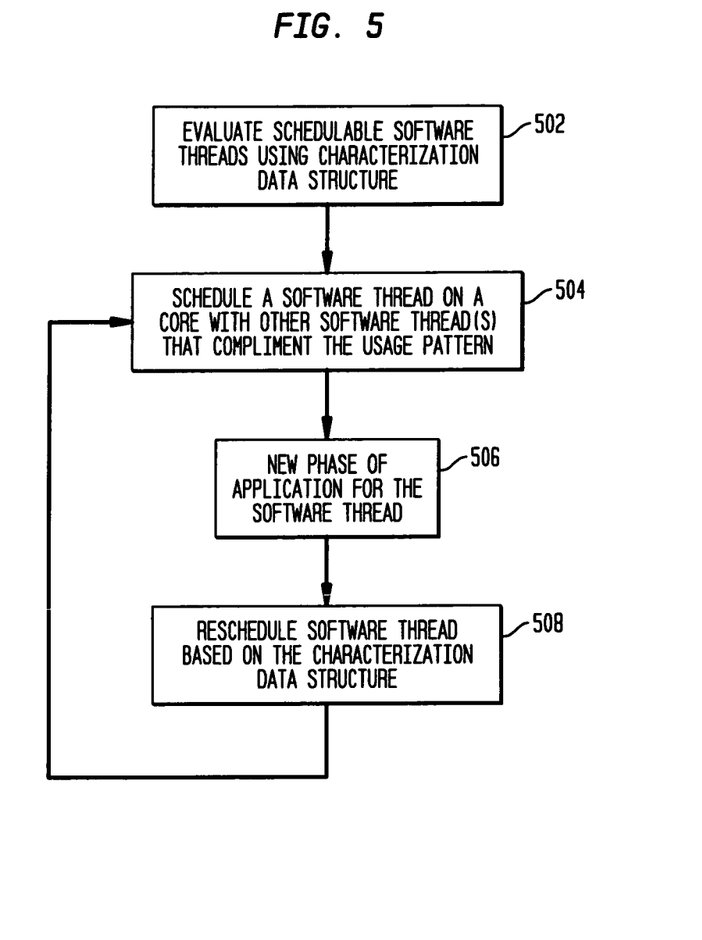
FIG. 5 is a flow diagram illustrating a method for scheduling functional units on simultaneous multithreaded processors an exemplary embodiment of the present disclosure.

In an exemplary embodiment, the operating system or the like uses the characterization data structure to schedule threads or groups of threads on a core. The data can also be used to determine the scheduling order of threads, or otherwise determine and predict resource availability for a given thread, for instance, to optimize the use of functional units and the like on a core and to maximize the efficiency and throughput of the threads running on a core. FIG. 5 is a flow diagram illustrating a method for scheduling threads in one embodiment of the present disclosure. At 502, an operating system evaluates software threads it receives to schedule and their usage attributes characterized in the data structure. Software threads may be programs such as streaming applications, applications that may perform matrix computations, or any other programs that may run on a computer device. At 504, the operating system schedules a thread with other threads that complement the usage pattern of the given thread, such that the usage of the functional units and the like on a core is maximized while the threads run on the core. For example, groups of threads that have complementary usage patterns for different functional units and the like on a core are scheduled together. As an example, thread id 1 (410) and thread id 2 (422) in FIG. 4 have relatively complementary usage patterns at least in phase 1. For instance, while thread id 1's floating point unit 1 usage in phase 1 is high, thread id 2's floating point unit 1 usage in phase 1 is low. Similarly, thread id 1's floating point unit 2 usage in phase 1 is low, while, thread id 2's floating point unit 2 usage is high. Likewise, thread id 1's integer unit 1 and integer unit 2 usages are low in phase 1, while thread id 2's usage of integer unit 1 and integer unit 2 usage are high in phase 1. Thus, the usage patterns of thread id 1 and thread id 2 complement one another. Accordingly, in an exemplary embodiment of the present disclosure, the operating system or the like schedules thread id 1 and thread id 2 together. In this way, when the two threads run, they are not competing for one particular processing element on the core that they both need to use heavily.

In one embodiment, scheduling threads that have complementary usage patterns may involve looking at the threads that are already running on different cores and comparing their characterization with that of a new thread for scheduling. For instance, when an operating system receives a software thread to schedule, the operating system evaluates the running threads on each core. A core is selected that are running threads that have usage patterns that complement that of the new thread for scheduling. The new thread is then scheduled on the selected core. In one embodiment, once the software thread is scheduled on a core with other threads having complementary usage pattern, it is left to the hardware to multiplex the threads among different functional units on the core.

At 506, the application or the software thread that was scheduled enters a different phase. In an exemplary embodiment of the present disclosure, the operating system may re-evaluate the characterization of the threads running on a core when an application enters a new phase. Since threads running on the same core may not have the complementary usage pattern throughout all phases of their execution, re-evaluating the characterization and migrating the threads for each phase helps to maximize the throughput. Thus, at 508, the software thread in a new phase is rescheduled, for example, matched up with another thread that has a complementary usage patterns. This may involve migrating the software thread to a different core to run with other threads on that core. The processing then returns to step 504, where the thread is running with other software threads that complement its usage pattern.

Figure 6:
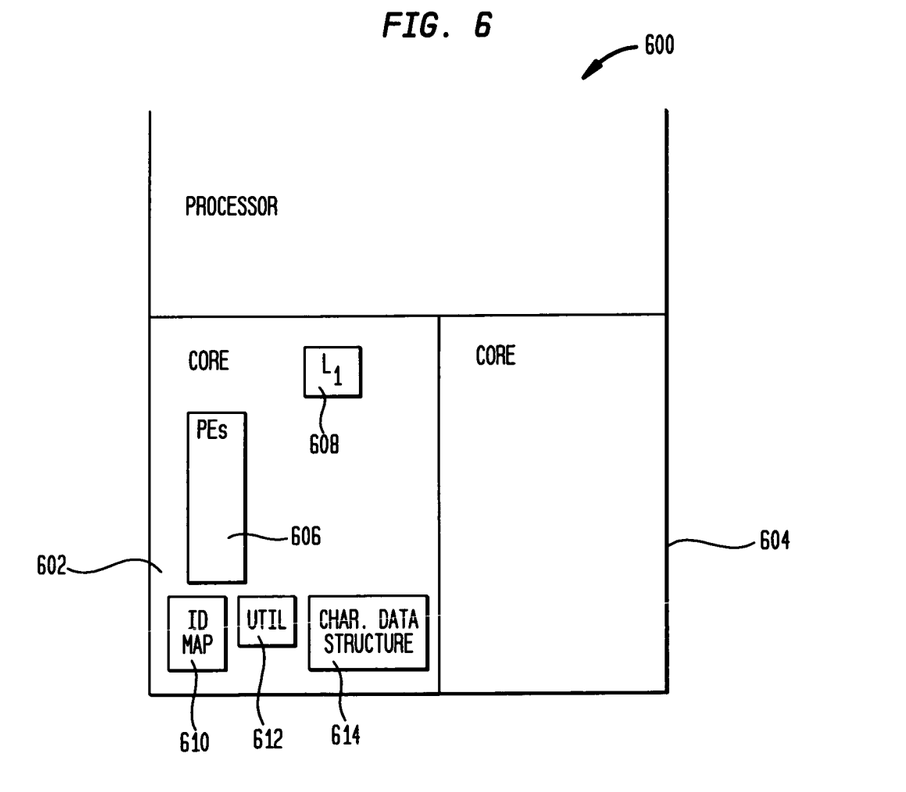
FIG. 6 is a diagram illustrating an example of processor components in one embodiment of the present disclosure.

FIG. 6 is a diagram illustrating an example of processor components in one embodiment of the present disclosure. A processor 600, for instance, may include one or more cores 602, 604. The example shown in FIG. 6 illustrates a dual-cored processor. Each core 602, 604 may include a set of processing elements 606 or functional units and cache memory 608 on which SMT is performed. Processing elements 606, for instance, may include one or more floating point units (FPU), integer units, arithmetic and logic units (ALU), registers, decoders, shifters, load-store units, etc., enabled to process thread executions. In one embodiment of the present disclosure, the core may also include registers 610, 612, 614 for storing information associated with various characteristics of a thread as described above. The register at 610, for example, may store mappings of software threads identifiers to their corresponding hardware thread identifiers. In one embodiment, an operating system accesses this register to log its software thread ids, and the hardware inserts the corresponding hardware thread ids. Thereafter, communications regarding the threads between the operating system and the hardware may be performed using the thread id mappings.

In one embodiment, the register table at 612 may store information regarding various characterization or attributes of a thread. For instance, it stores the usage information such as the amount of usage of various resources on the core, the amount of cache usage, etc. The operating system in one embodiment accesses the information, performs analysis based on the information and builds a data structure that characterizes a thread's usage pattern by each phase. The register at 614 stores information pertaining to characterization of the usage pattern, which the operating system uses to schedule threads or otherwise provide scheduling information. The characterization data structure may be stored in any memory the operating system or the like has access to, and such characterization data structures can be examined for multiple cores allowing the operating system make inter-core thread scheduling decisions.

By using the logged information characterizing a given thread's attributes and resource usage, the operating system is able to make decisions as to which threads should or should not be scheduled together or near each other. For example, the operating system may determine how much each thread makes uses of the different processing elements on the core, evaluate the threads the operating system has to schedule, decide whether scheduling certain threads together would improve overall throughput. In an exemplary embodiment of the present disclosure, the threads are scheduled together according to their complementariness in usage of various processing elements on a core such that when the hardware switches in a thread on the core, the thread does not stall because it has to wait for a functional unit that is already busy with another thread on the core.

In an exemplary embodiment of the present disclosure the characterization and usage information about different threads executing on a given core are obtained and gathered during the real time processing of the hardware threads. In another embodiment, the execution environment may be modeled and simulated to obtain the information.

The embodiments described above are illustrative examples and it should not be construed that the present invention is limited to these particular embodiments. For example, the various data such as the usage data and thread mapping data may be stored in a series of registers or fast on-core memory or the like or any other storage capable of storing data or any combination thereof. Thus, various changes and modifications may be effected by one skilled in the art without departing from the spirit or scope of the invention as defined in the appended claims.

We claim:

1. A method of scheduling one or more threads in multi-threaded processing, comprising:
   determining usage pattern characterization of hardware resources on a core, the usage pattern characterization associated with a first thread, the hardware resources including at least two or more functional units, wherein the hardware resources include more than one of a same type of functional unit, the usage pattern characterization including the first thread's usage count of each of the functional units on the core or amount of use of each of the functional units on the core, wherein a utilization table comprises a plurality of registers, each of the registers allocated to a respective thread of the one or more threads and comprising at least an entry for each functional unit the respective thread uses, and wherein hardware updates an entry of a register of the utilization table associated with the first thread and associated respective functional unit every time the first thread uses the associated respective functional unit;
   selecting a core running one or more threads that has usage pattern characterization that complements the usage pattern characterization associated with the first thread, the selected core running the one or more threads in simultaneous multithreaded processing mode; and
   scheduling the first thread on the selected core,
   wherein an operating system determines scheduling order of threads based on entries in the utilization table.

2. The method of claim 1, wherein the determining step includes:
   evaluating usage pattern of hardware resources on a core associated with the first thread.

3. The method of claim 2, wherein the evaluating step is performed by the operating system.

4. The method of claim 1, wherein the determining step includes:
   locating an empty core;
   running the first thread on the empty core;
   tracking usage of one or more hardware resources on the empty core; and
   characterizing usage pattern based on the tracked usage for each phase of execution associated with the first thread.

5. The method of claim 4, wherein the step of tracking includes:
   tracking usage of one of more hardware resources for each phase of execution associated with the first thread.

6. The method of claim 1, wherein the determining step includes:
   tracking by hardware usage of one or more hardware resources; and
   storing by hardware the usage in registers or fast on-core memory or combination thereof.

7. The method of claim 1, wherein the determining step includes:
   determining usage pattern characterization of hardware resources on a core associated with the first thread for each phase of execution associated with the first thread.

8. The method of claim 1, further including:
   re-evaluating the usage pattern characterization associated with the first thread in a new phase of execution when the first thread enters the new phase of execution; and
   rescheduling the first thread in the new phase with one or more second threads having complementary usage pattern characterization.

9. The method of claim 1, wherein the hardware resources includes at least one or more processing elements, one or more functional units, one or more cache memory, or combination thereof.

10. The method of claim 1, wherein the hardware resources includes at least a floating point unit, an integer unit, an arithmetic and logic unit, a shifter, a register, a load-store unit, cache memory or combination thereof.

11. The method of claim 1, wherein the step of scheduling is performed by the operating system.

12. The method of claim 1, further including:
    communicating between software and hardware information associated with one or more threads by using software thread identifier to hardware thread identifier mapping.

13. A method of scheduling one or more threads in multi-threaded processing, comprising:
    evaluating a plurality of usage pattern characterizations of hardware resources on a core including two or more functional units, wherein the hardware resources include more than one of a same type of functional unit, the plurality of usage pattern characterizations associated respectively with a plurality of threads for scheduling, the usage pattern characterizations including the respective thread's usage count of each of the functional units on the core or amount of use of each of the functional units on the core, wherein a utilization table comprises a plurality of registers, each of the registers allocated to a respective thread of the plurality of threads and comprising at least an entry for each functional unit the respective thread uses, and wherein hardware updates an entry of a register of the utilization table associated with a thread and associated respective functional unit every time the thread uses the associated respective functional unit;
    selecting a subset of threads from the plurality of threads for scheduling, the subset of threads having complementary usage pattern characterizations to one another; and
    scheduling the subset of threads together on a core running in simultaneous multithreaded processing mode, wherein an operating system determines scheduling order of threads based on entries in the utilization table.

14. The method of claim 13, wherein the hardware resources include one or more processing elements, one or more functional units, one or more cache memory, or combination thereof.

15. A method of scheduling one or more threads in multi-threaded processing, comprising:

evaluating a first thread's first phase usage pattern characterization of hardware resources on a core, wherein the hardware resources include more than one of a same type of functional unit, the usage pattern characterization including the first thread's usage count of each of the functional units on the core or amount of use of each of the hardware resources on the core, wherein a utilization table comprises a plurality of registers, each of the registers allocated to a respective thread of the one or more threads and comprising at least an entry for each functional unit the respective thread uses, and wherein hardware updates an entry of a register of the utilization table associated with the first thread and associated respective functional unit every time the first thread uses the associated respective functional unit;

selecting a core running one or more threads that have usage pattern characterizations that complement the first thread's first phase usage pattern characterization, the selected core running the one or more threads in simultaneous multithreaded processing mode;

scheduling the first thread on the selected core;

when the first thread enters a second phase, evaluating the first thread's second phase usage pattern characterization of hardware resources on a core; and rescheduling the first thread, wherein an operating system determines scheduling order of threads based on entries in the utilization table.

16. The method of claim 15, wherein the step of rescheduling includes rescheduling the first thread if the one or more threads running on the selected core do not have usage pattern characterizations that complement the first thread's second phase usage pattern characterization.

17. The method of claim 15, wherein the step of rescheduling includes rescheduling the first thread on a second core.

18. A system for scheduling threads, comprising:

a processor;

a controller unit running on the processor operable to keep track of usage of two or more hardware resources by a selected thread running on a core, the two or more hardware resources including at least two or more functional units, wherein the hardware resources include more than one of a same type of functional unit, the usage pattern characterization including the selected thread's usage count of each of the functional units on the core or amount of use of each of the functional units on the core;

a utilization table comprising a plurality of registers, each of the registers allocated to a respective thread of the one or more threads and comprising at least an entry for each functional unit the respective thread uses, and wherein hardware updates an entry of a register of the utilization table associated with the selected thread and associated respective functional unit every time the selected thread uses the associated respective functional unit; and a scheduler operable to use the tracked usage associated with the selected thread to schedule the selected thread on a core running one or more other threads having usage patterns that complement the usage associated with the selected thread, wherein the scheduler determines a scheduling order of threads based on entries in the utilization table.

19. The system of claim 18, wherein the scheduler is an operating system.

20. The system of claim 18, wherein the two or more hardware resources includes one or more processing elements, one or more functional units, one or more cache memory, or combination thereof.

* * * * *